(12) United States Patent
Odajima et al.

(10) Patent No.: US 8,242,642 B2
(45) Date of Patent: Aug. 14, 2012

(54) VIBRATION ACTUATOR

(75) Inventors: Shin Odajima, Tokyo (JP); Noboru Segawa, Saitama (JP); Yoshihide Tonogai, Saitama (JP); Ryuta Yamawaki, Kawaguchi (JP); Tomoaki Hoshina, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 126 days.

(21) Appl. No.: 12/915,986

(22) Filed: Oct. 29, 2010

(65) Prior Publication Data

US 2011/0101796 A1 May 5, 2011

(30) Foreign Application Priority Data

Oct. 29, 2009 (JP) .................................. 2009-249316

(51) Int. Cl.
*H02K 33/00* (2006.01)
(52) U.S. Cl. .......................................... 310/25; 310/15
(58) Field of Classification Search .................... 310/15, 310/25, 36, 30, 81
See application file for complete search history.

(56) References Cited

U.S. PATENT DOCUMENTS

| | | | | |
|---|---|---|---|---|
| 6,933,630 B2* | 8/2005 | Kraus et al. | ..................... | 310/38 |
| 6,958,553 B2* | 10/2005 | Ichii et al. | ........................ | 310/15 |
| 2003/0164647 A1* | 9/2003 | Kobayashi et al. | ............. | 310/12 |
| 2011/0012441 A1* | 1/2011 | Oh et al. | ........................ | 310/25 |

FOREIGN PATENT DOCUMENTS

| | | |
|---|---|---|
| JP | 10-117472 | 5/1998 |
| JP | 2002-177882 | 6/2002 |
| JP | 2002-200460 | 7/2002 |
| JP | 2003-24871 | 1/2003 |

* cited by examiner

*Primary Examiner* — Nguyen N Hanh
(74) *Attorney, Agent, or Firm* — Beyer Law Group LLP (57) ABSTRACT

A vibration actuator includes a coil that extends in a vibration direction and has a flat shape and a magnet that extends in the vibration direction and has a flat shape, so that a case can be made flat or low profile. A weight portion is supported by a shaft, so that, when a drop impact is applied, the weight portion can move along the shaft and the weight portion is not freely moved in the case. A coil spring is disposed between a spring receiving portion and a weight portion. Therefore there is no unnecessary space in the case, so that space can be saved and the vibration actuator can be made compact.

6 Claims, 8 Drawing Sheets

VIBRATION ACTUATOR

The present application claims the benefit of 35 U.S.C. §119 based on Japanese Patent Application No. 2009-249316, filed Oct. 29, 2009, which is hereby incorporated by reference in its entirety.

BACKGROUND OF THE INVENTION

1. Field of the Invention

The present invention relates to a vibration actuator having a compact size, which is used as a vibration generator for notifying a user of an incoming call to a mobile wireless apparatus such as a mobile phone, or as a vibration generator for providing tactile sensation of a touch panel or the reality of a games machine to a user's finger or hand.

2. Description of the Related Art

Japanese Unexamined Patent Application Publication No. 10-117472 describes a technology in such a field. FIG. 1 of that publication illustrates a vibration actuator including a frame body and a soft elastic body that is fixed to the inner surface of the frame body. A cylindrical yoke, which is made of a magnetic substance, is disposed in the frame body. The yoke also serves as a weight for generating vibration, and is supported by a plate spring in the case. The plate spring has a shape like a conical spiral. The plate spring is fixed to a plate-shaped first elastic body that covers an opening of the case. An annular coil is inserted into the annular groove that is formed in an end face of the yoke. The coil is fixed to a plate-shaped second elastic body, which closes another opening of the frame body. An annular magnet is fixed to a wall of the groove. When an electric current having a predetermined frequency is applied to the coil of such a vibration actuator, the yoke, which functions as a weight, vibrates along the central axis, and the first and second elastic bodies resonate with each other at a desired frequency, whereby the frame body is vibrated in a desired manner (See Japanese Unexamined Patent Application Publication Nos. 10-117472, 2002-177882, 2003-24871, and 2002-200460.)

SUMMARY OF THE INVENTION

However, because the yoke of the vibration actuator described above vibrates along the central axis of the frame body having a cylindrical shape, in order to increase the amplitude of the vibration of the yoke, the length of the frame body along the central axis needs to be increased, which makes it difficult to produce a low-profile vibration actuator. Moreover, the yoke swings in the frame body relatively freely. Therefore, if the vibration actuator were dropped, it is highly likely that the yoke would violently collide with the frame body, so that shock resistance of this vibration actuator is low. In order to lessen the impact of a collision between the frame body and the yoke, various measures are necessary. As a result, a problem arises in that the structure of the vibration actuator becomes complex.

An object of the present invention is to provide a vibration actuator that has a low profile, a simple structure, and a high drop-impact resistance.

According to an aspect of the present invention, in a vibration actuator in which a magnet linearly vibrates in cooperation with a coil facing the magnet, the coil being fixed to a case, the vibration actuator includes the coil that extends in a vibration direction, the coil having a flat shape; the magnet that extends in the vibration direction, the magnet having a flat shape; a shaft that extends in the vibration direction, the shaft being fixed to the case at both ends thereof; a spring receiving portion disposed in the case, the shaft extending through the spring receiving portion; a weight portion disposed between the spring receiving portion and the case, the shaft extending through the weight portion, and the weight portion being connected to the magnet; and a spring supported by the weight portion at one end thereof and supported by the spring receiving portion at the other end thereof.

The vibration actuator includes the coil, which extends in the vibration direction and has a flat shape, and the magnet, which extends in the vibration direction and has a flat shape, so that the case can be made flat or low profile. As compared with a vibration motor in which a magnet rotates, sharp and strong vibration can be produced with the vibration generator according to the present invention, in which the magnet linearly vibrates in in-plane direction. Moreover, the weight portion is supported by the shaft. Therefore, when a drop impact is applied, the weight portion can move along the shaft. Thus, the weight portion is not freely moved in the case, so that complex shock absorbing means for absorbing the impact of a collision between the case and the weight portion is not necessary, and malfunctioning of the vibration actuator due to deforming of the weight portion that may be caused by the collision is unlikely to occur. Therefore, the vibration actuator has a high drop-impact resistance with a simple structure. The spring is disposed between the spring receiving portion and the weight portion. Therefore, there is no unnecessary space in the case, so that space can be saved and the vibration actuator can be made compact. The vibration actuator has a high-efficiency, and vibration having long repetition life can be generated in a small space.

It is preferable that the spring be a coil spring that is wound around the shaft, the weight portion includes a first weight portion and a second weight portion that are disposed on both sides of the magnet with respect to the vibration direction, and the coil spring be disposed between the first weight portion and the spring receiving portion.

Thus, the weight portions are disposed so that the magnet is interposed therebetween. Therefore, well-balanced vibration can be generated. A coil spring having a large free length can be used. Therefore, the spring easily resonate, and large vibration can be obtained with a small driving power.

It is preferable that another coil spring be disposed between the second weight portion and the spring receiving portion.

The coil springs, which naturally have hysteresis, are disposed between the first weight portion and the second weight portion with the spring receiving portion interposed therebetween. Therefore, well-balanced vibration can be generated. Moreover, because a load due to vibration is shared by the coil springs, whereby the durability and the life of the springs are increased.

It is preferable that the magnet and the coil be disposed between a first yoke plate and a second yoke plate that are disposed parallel to each other and separated from each other in a direction perpendicular to the vibration direction, and both ends of the first and second yoke plates are fixed to the first and second weight portions, the magnet be fixed to a flat surface portion of the first yoke plate, and the coil be disposed so as to face the magnet and the second yoke plate with a distance therebetween.

By using the first and second yoke plates that are disposed parallel to each other, an optimal magnetic circuit is formed in the case and efficient and uniform vibration can be generated in in-plane direction while maintaining the low-profile of the vibration actuator.

According to the present invention, a vibration actuator having a low-profile, a simple structure, and a high drop-impact resistance can be provided.

DESCRIPTION OF THE PREFERRED EMBODIMENTS

Hereinafter, a vibration actuator according to embodiments of the present invention will be described in detail.

Referring to FIGS. 1 to 5, a vibration actuator 1 includes a case 4 having a flat shape. The case 4 includes a base plate 2 and a lid portion 3. The case 4 contains a coil 6 and a magnet 7. The coil 6 has a flat annular shape and is fixed to the base plate 2. The magnet 7 has a flat plate-like shape and is disposed so as to face the coil 6. The magnet 7 includes magnet portions 7a and 7b. Each of the magnet portions 7a and 7b is magnetized so that one of the planes thereof is the north pole and the other of the planes thereof is the south pole. The magnet 7 is made by bonding the side surfaces of the magnet portions 7a and 7b to each other in such a way that the north pole of the magnet portion 7a faces the south pole of the magnet portion 7b in in-plane direction. The magnet 7 may be made by magnetizing a single magnetic plate.

The coil 6 is connected to a terminal electrode 5 of the base plate 2 through wiring 5a. When an electric current in the form of a square wave or sinusoidal wave is applied to the coil 6 through the terminal electrode 5, the magnet 7 linearly vibrates in in-plane direction.

The magnet 7 is fixed to a flat surface 8a on the back side of a first yoke plate 8, which is made of a magnetic substance, with an adhesive. Ends of the first yoke plate 8 are attached to first and second weight portions 11 and 12 so as to bridge a gap between the first weight portion 11 and the second weight portion 12. The first and second weight portions 11 and 12 have the same shape and weight and extend in a direction perpendicular to the vibration direction. Shafts 13 extend through both ends of each of the first and second weight portions 11 and 12. Both ends of each of the shafts 13 are fixed to upright portions 2a that are disposed at ends of the base plate 2 of the case 4. The shafts 13 extend in the vibration direction, and guide and support the first and second weight portions 11 and 12. The first and second weight portions 11 and 12 are made of tungsten or the like. Therefore, the first and second weight portions 11 and 12 may be provided with resin portions for reducing friction, and the shafts 13 may be slidably inserted through the resin portions.

Spring receiving portions 14 are disposed between the first and second weight portions 11 and 12. The spring receiving portions 14 stand on the base plate 2 of the case 4, and the shafts 13 extend through the spring receiving portions 14.

With such a structure, the first and second weight portions 11 and 12 are disposed between the spring receiving portions 14 and the lid portion 3 of the case 4 with respect to the vibration direction.

First coil springs 16 are disposed between the first weight portion 11 and the spring receiving portions 14. The shafts 13 extend through the first coil springs 16. Second coil springs 17 are disposed between the second weight portion 12 and the spring receiving portions 14. The shafts 13 extend through the second coil springs 17. The first coil springs 16 and the second coil springs 17 have the same spring constant and the same length. Both ends of the first and second coil springs 16 and 17 are supported by the first weight portion 11, the second weight portion 12, and the spring receiving portions 14 without being fixed.

The first yoke plate 8 and a flat plate portion 18A of a second yoke plate 18 are disposed so as to extend parallel to each other and so as to be separated from each other in a direction perpendicular to the vibration direction. The magnet 7 and the coil 6 are disposed between the first yoke plate 8 and the flat plate portion 18A of the second yoke plate 18. The first yoke plate 8 is made of a magnetic substance and is fixed to upper surfaces of the first and second weight portions 11 and 12 with adhesive. The second yoke plate 18 is made of a magnetic substance and is riveted to the first and second weight portions 11 and 12. Both ends of the second yoke plate 18 are bent so that the second yoke plate 18 is U-shaped. Bent pieces 18a and 18b are formed by bending the ends of the flat plate portion 18A of the second yoke plate 18 at right angles. Through-holes 18c and 18d are formed in the bent pieces 18a and 18b, and protrusions 11a and 12a of the first and second weight portions 11 and 12 are inserted through the through-holes 18c and 18d. The second yoke plate 18 and the first and second weight portions 11 and 12 are riveted to each other by flattening the heads of the protrusions 11a and 12a.

The flat coil 6 is disposed between the magnet 7 and the flat plate portion 18A of the second yoke plate 18. The coil 6 is disposed so as to face the magnet 7 and the flat plate portion 18A of the second yoke plate 18 with a distance therebetween. By using the first and second yoke plates 8 and 18 that are disposed parallel to each other, an optimal magnetic circuit is formed in the case 4 and efficient and uniform vibration can be generated in in-plane direction while maintaining the low-profile of the vibration actuator 1.

The vibration actuator 1 includes the coil 6, which extends in the vibration direction and has a flat shape, and the magnet 7, which extends in the vibration direction and has a flat shape. Therefore, the case 4 can be made flat or low-profile. Compared with a vibration motor in which a magnet rotates, the vibration actuator 1 according to the present invention, in which the magnet 7 linearly vibrates in in-plane direction, generates a sharp and large vibration.

The weight portions 11 and 12 are supported by the shafts 13. When a drop impact is exerted on the vibration actuator 1, the weight portions 11 and 12 are moved along the shafts 13, whereby the weight portions 11 and 12 are not freely moved in the case 4. Therefore, complex shock absorbing means for cushioning a collision between the case 4 and the weight portions 11 and 12 is not necessary, and malfunctioning of the vibration actuator 1 due to deforming of the weight portions 11 and 12 caused by the collision is unlikely to occur. Therefore, the drop impact resistance of the vibration actuator 1 is increased with a simple structure.

Coil springs 16 and 17 are disposed between the spring receiving portions 14 and the weight portions 11 and 12. Therefore, there is no unnecessary space in the case 4, so that space can be saved, and the vibration actuator 1 can be made compact. Instead of the coil spring, other types of springs, such as a plate spring, may be used to obtain the same effect.

By disposing the coil springs 16 and 17 in this way, coil springs having large free lengths can be used. Therefore, the springs easily resonate with each other, and large vibration can be obtained with a small driving power.

The weight portions 11 and 12 are disposed so that the magnet 7 is interposed therebetween with respect to the vibration direction. Therefore, well-balanced vibration can be generated.

The coil springs 16 and 17, which naturally have hysteresis, are disposed between the first weight portion 11 and the second weight portion 12 with the spring receiving portions 14 interposed therebetween. Therefore, well-balanced vibration can be generated. Moreover, because a load due to vibration is shared by the coil springs 16 and 17, whereby the durability and the life of the springs are increased.

Needless to say, the present invention is not limited to the embodiment described above.

Figure 1:
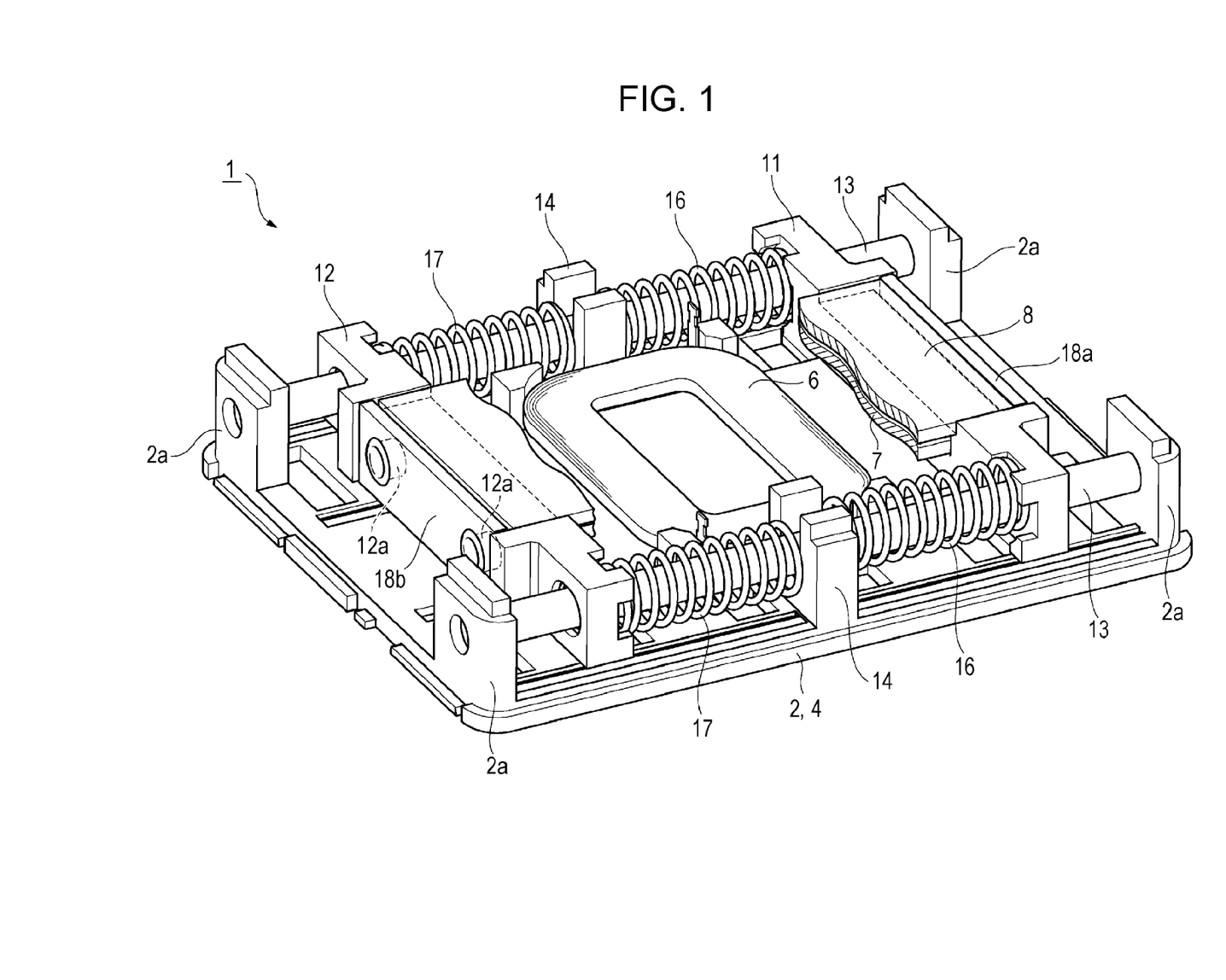
FIG. 1 is a perspective view illustrating the internal structure of a vibration actuator according to a first embodiment of the present invention.
Figure 2:
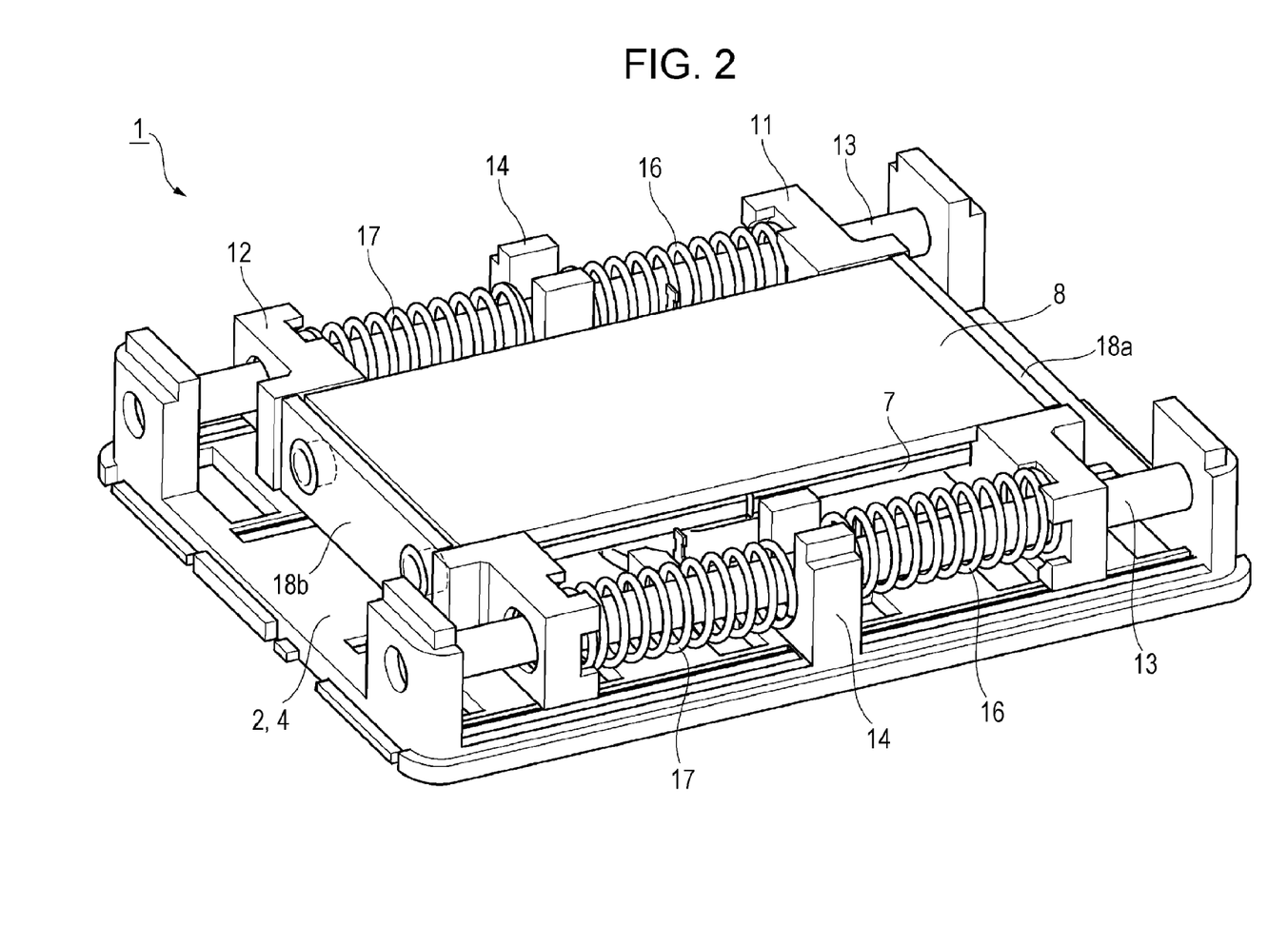
FIG. 2 is a perspective view illustrating the vibration actuator according to present invention from which a lid portion is removed.
Figure 3:
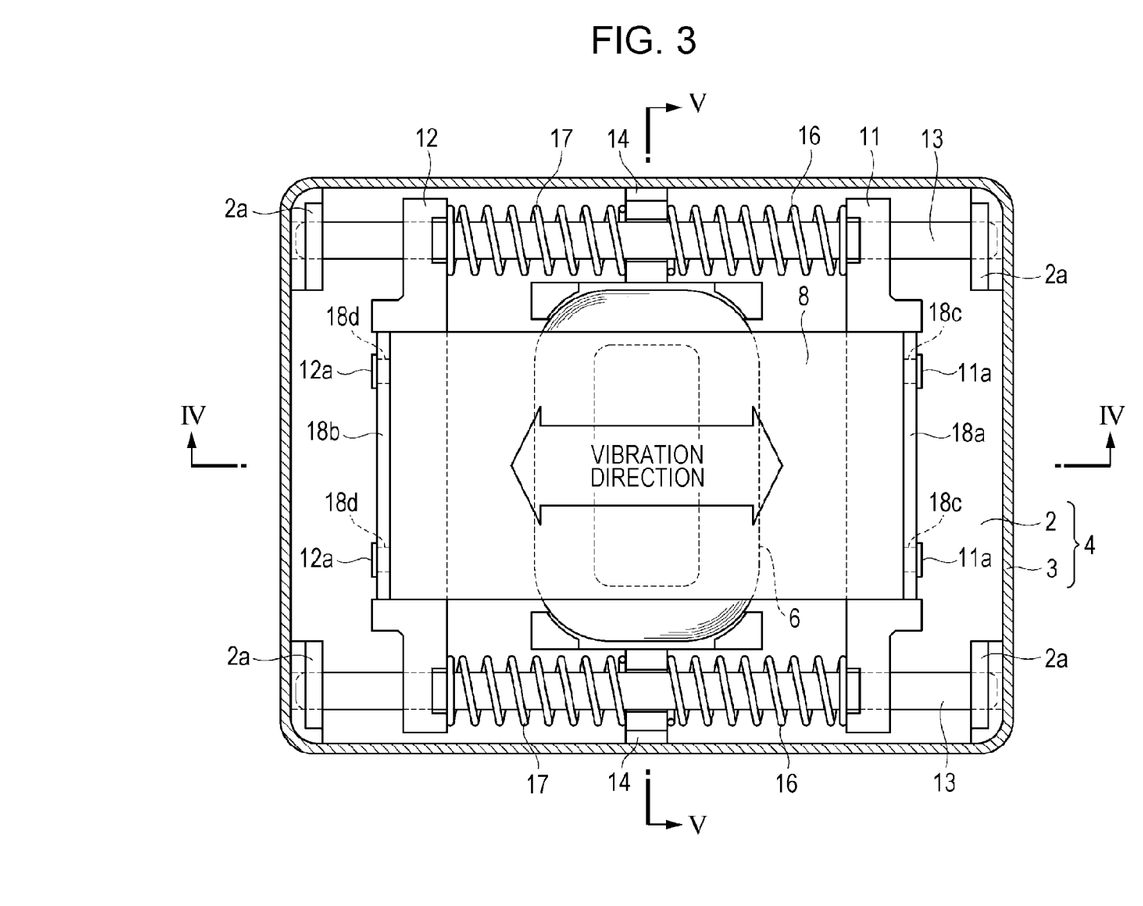
FIG. 3 is a plan view of the vibration actuator according to the present invention in which the lid portion is cut so as to expose the internal structure of the vibration actuator.
Figure 4:
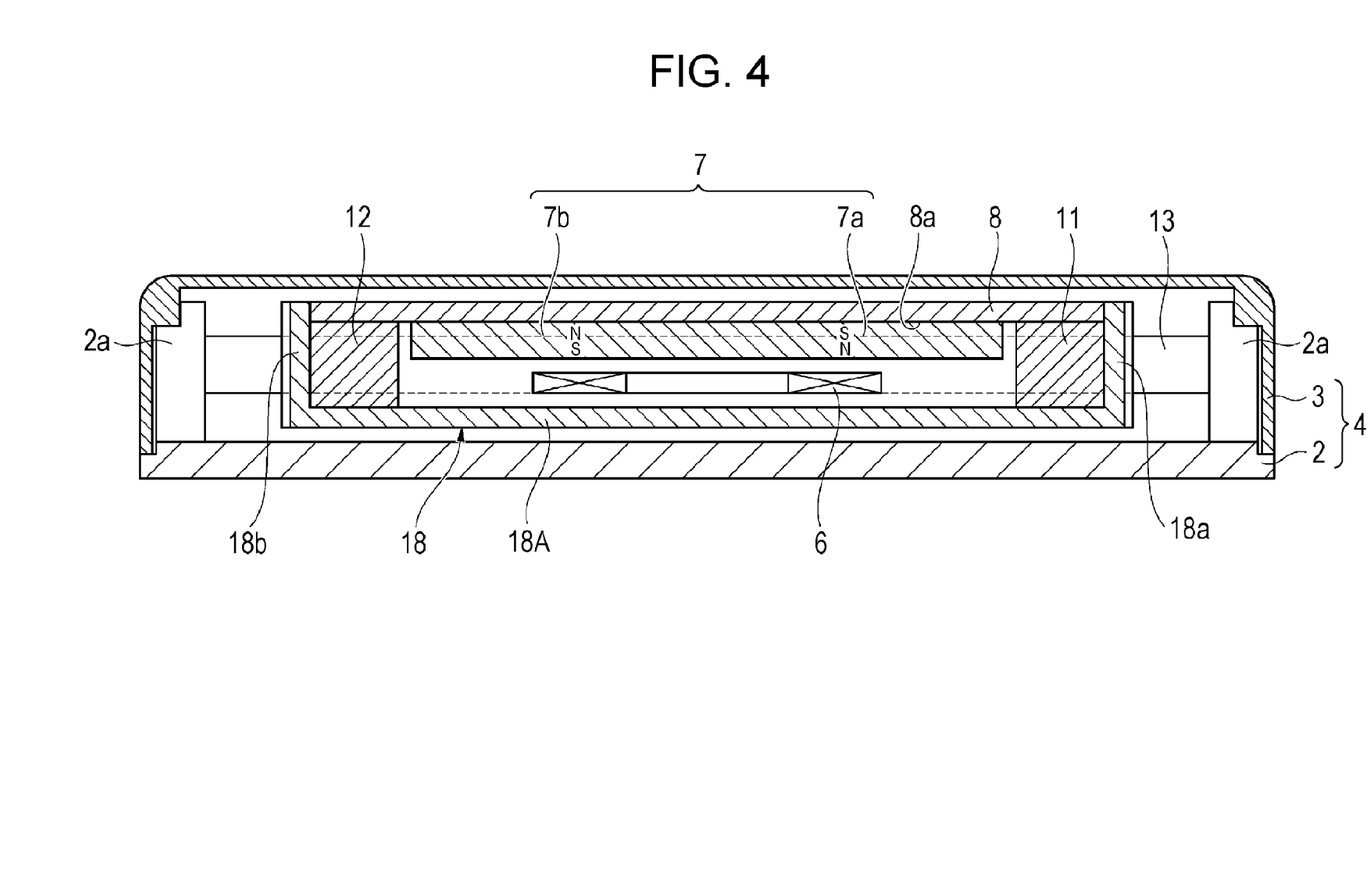
FIG. 4 is a sectional view taken along line IV-IV of FIG. 3.
Figure 5:
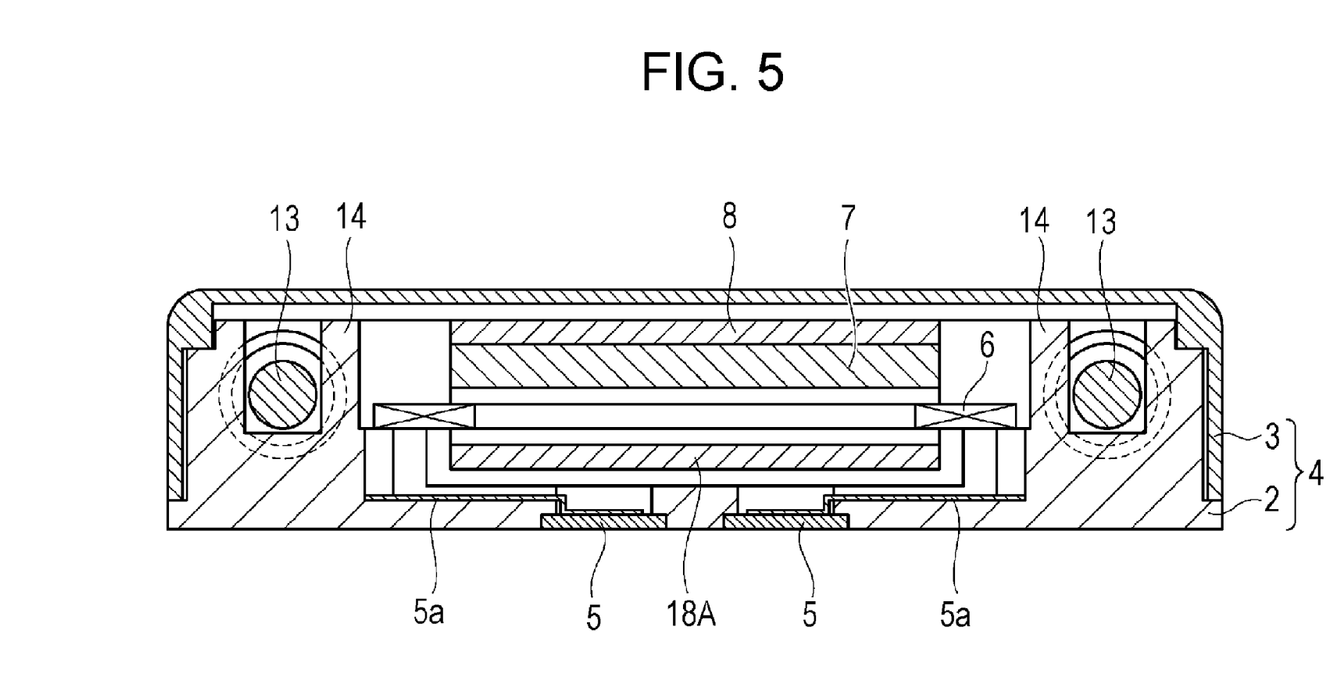
FIG. 5 is a sectional view taken along line V-V of FIG. 3.
Figure 6:
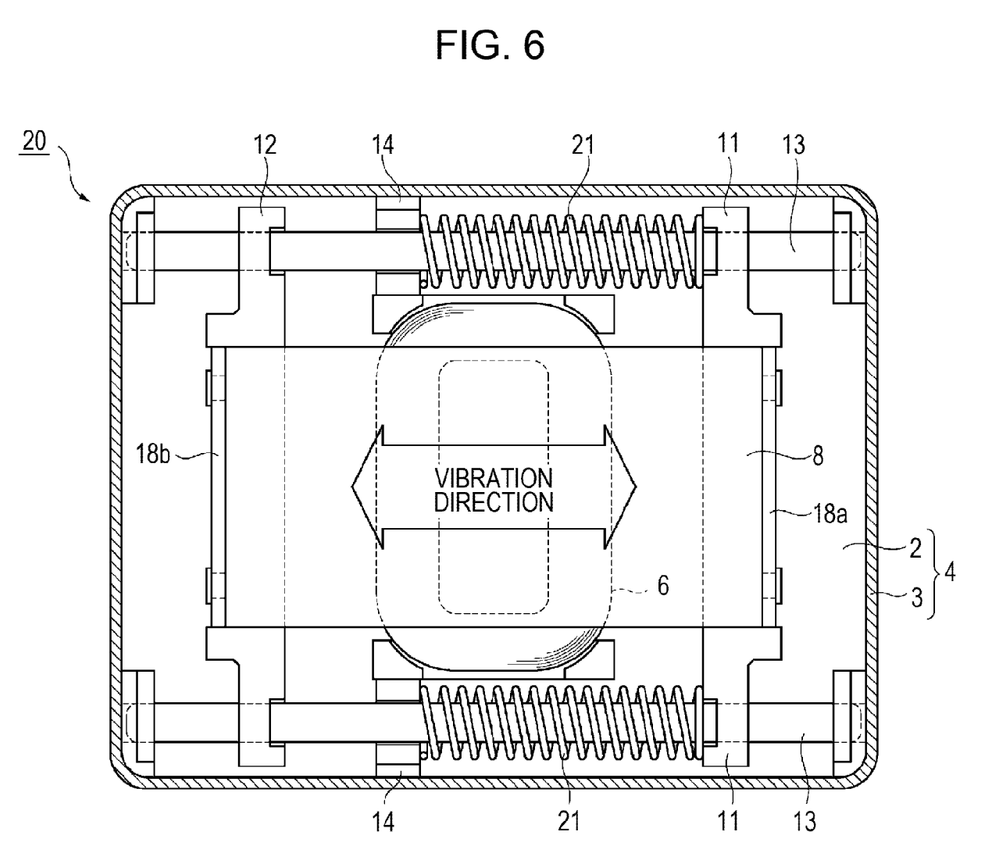
FIG. 6 is a plan view illustrating a vibration actuator according to a second embodiment of the present invention.

For example, referring to FIG. 6, in a vibration actuator 20, coil springs 21 are disposed only between the first weight portion 11 and the spring receiving portions 14, and both ends of the coil springs 21 are fixed to the first weight portion 11 and the spring receiving portions 14. In this case, the vibration actuator 20 vibrates while the coil springs 21 and the first weight portion 11 are in contact with each other. Therefore, the weight portions 11 and 12 are not freely moved if the vibration actuator 20 is dropped when the power is off. In other respects, the vibration actuator 20 has the same structure as the vibration actuator 1.

Figure 7:
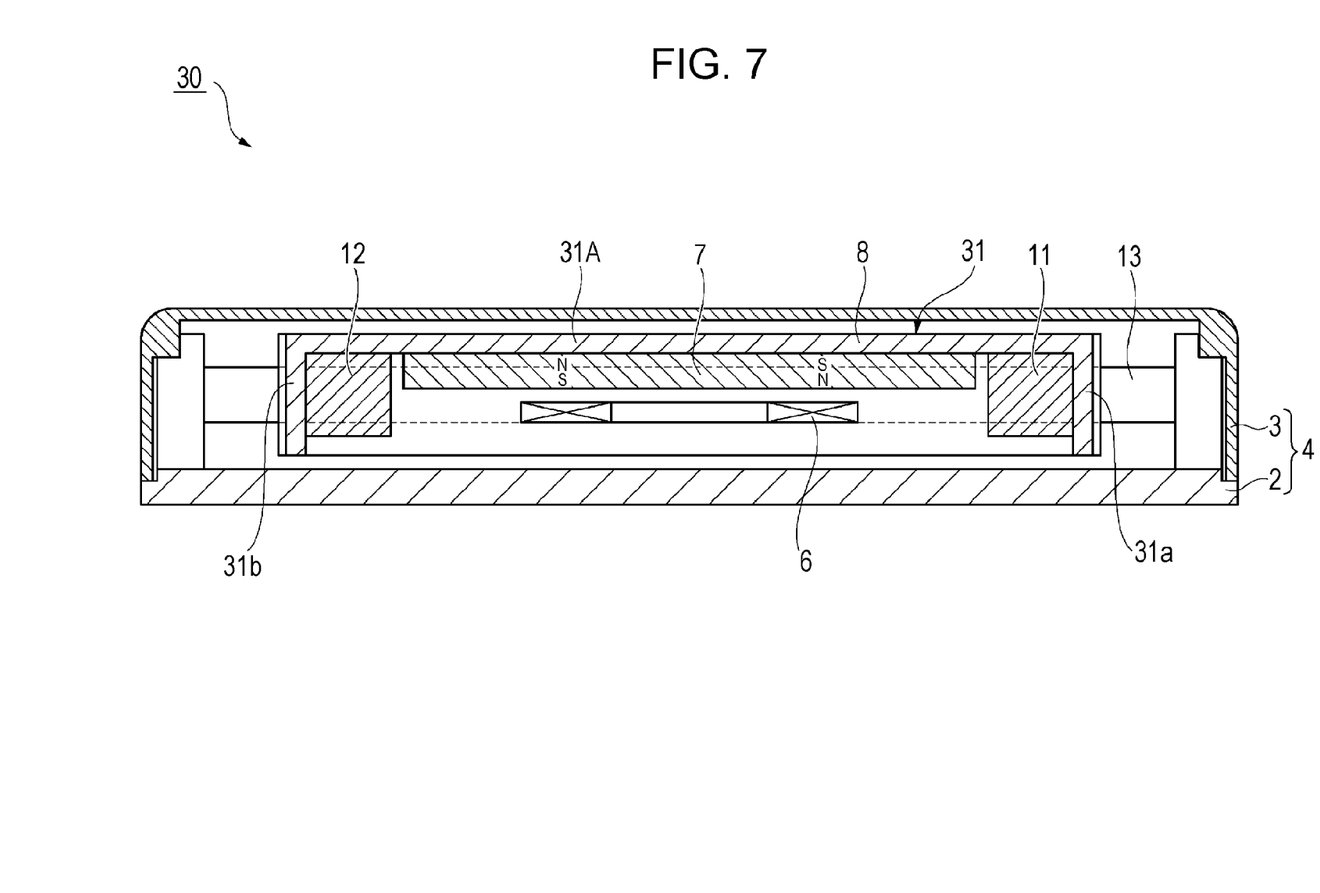
FIG. 7 is a sectional view illustrating a vibration actuator according to a third embodiment of the present invention.

Referring to FIG. 7, a vibration actuator 30 does not include the second yoke plate 18 adjacent to the coil 6. Both ends of a first yoke plate 31, to which the magnet 7 is fixed, are bent so that the first yoke plate 31 is U-shaped. Bent pieces 31a and 31b are formed by bending the ends of a flat plate portion 31A of the first yoke plate 31 at right angles. Through-holes are formed in the bent pieces 31a and 31b, and protrusions of the first and second weight portions 11 and 12 are inserted through the through-holes. The first yoke plate 31 and the first and second weight portions 11 and 12 are riveted to each other by flattening the heads of the protrusions. In other respects, the vibration actuator 30 has the same structure as the vibration actuator 1.

Figure 8:
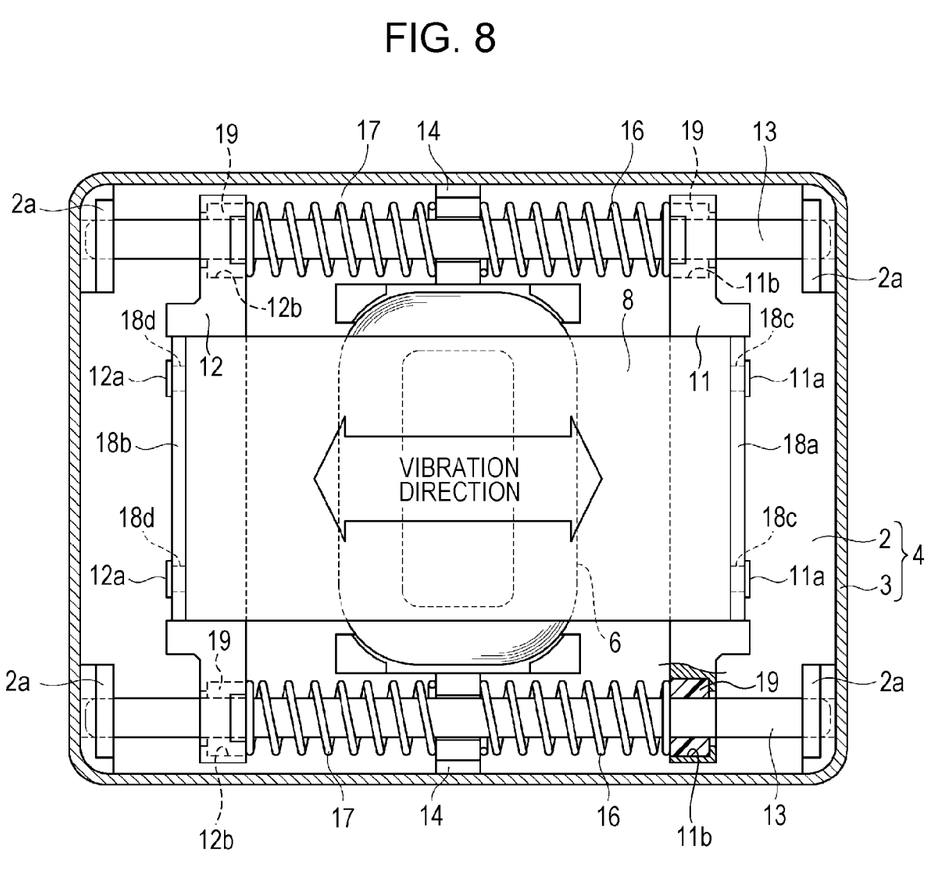
FIG. 8 is a plan view of the vibration actuator according to the present invention in which the lid portion is cut so as to expose the internal structure of the vibration actuator.

In each of the above embodiments, the first and second weight portions 11 and 12 may be provided with resin sleeves 19 as the resin portions. The shafts 13 may extend through the resin sleeves 19. FIG. 8 illustrates a vibration actuator including the resin sleeves 19. Bottomed recesses 11b are formed in the first weight portion 11. The openings of the bottomed recesses 11b face the coil springs 16. The resin sleeves 19 are fitted into the bottomed recesses 11b and interposed between the bottoms of the bottomed recesses 11b and the coil springs 16 with respect to the vibration direction. Likewise, bottomed recesses 12b are formed in the second weight portion 12, and the second weight portion 12 is provided with the resin sleeves 19. The vibration actuators 20 and 30 may also be provided with the resin sleeves 19.

What is claimed is:

1. A vibration actuator in which a magnet linearly vibrates in cooperation with a coil facing the magnet, the coil being fixed to a case, the vibration actuator comprising:
    the coil that extends in a vibration direction, the coil having a flat shape;
    the magnet that extends in the vibration direction, the magnet having a flat shape;
    a shaft that extends in the vibration direction, the shaft being fixed to the case at both ends thereof;
    a spring receiving portion disposed in the case, the shaft extending through the spring receiving portion;
    a weight portion disposed between the spring receiving portion and the case, the shaft extending through the weight portion, and the weight portion being connected to the magnet; and
    a spring supported by the weight portion at one end thereof and supported by the spring receiving portion at the other end thereof.

2. The vibration actuator according to claim 1,
    wherein the spring is a coil spring that is wound around the shaft, the weight portion includes a first weight portion and a second weight portion that are disposed on both sides of the magnet with respect to the vibration direction, and the coil spring is disposed between the first weight portion and the spring receiving portion.

3. The vibration actuator according to claim 2,
    wherein another coil spring is disposed between the second weight portion and the spring receiving portion.

4. The vibration actuator according to claim 2,
    wherein the magnet and the coil are disposed between a first yoke plate and a second yoke plate that are disposed parallel to each other and separated from each other in a direction perpendicular to the vibration direction, and both ends of the first and second yoke plates are fixed to the first and second weight portions, and
    wherein the magnet is fixed to a flat surface portion of the first yoke plate, and the coil is disposed so as to face the magnet and the second yoke plate with a distance therebetween.

5. The vibration actuator according to claim 2,
    wherein the magnet and the coil are disposed between a first yoke plate and a second yoke plate that are disposed parallel to each other and separated from each other in a direction perpendicular to the vibration direction, and both ends of the first and second yoke plates are fixed to the first and second weight portions, and
    wherein the magnet is fixed to a flat surface portion of the first yoke plate, and the coil is disposed so as to face the magnet and the second yoke plate with a distance therebetween.

6. The vibration actuator according to claim 1,
    wherein the weight portion includes a resin portion through which the shaft extends.

* * * * *